United States Patent
Lazare et al.

(10) Patent No.: US 10,117,251 B2
(45) Date of Patent: Oct. 30, 2018

(54) WIRELESS COMMUNICATION SYSTEM IN WHICH ONE RADIO ACCESS TECHNOLOGY OPERATES IN CONJUNCTION WITH A SECOND RADIO ACCESS TECHNOLOGY

(71) Applicant: CellXica Limited, Cambridge (GB)

(72) Inventors: Floyd Lazare, Cambridge (GB); Jon Wilson, Cambridge (GB); Niro Mahasinghe, Cambridge (GB); Anthony Timson, Cambridge (GB)

(73) Assignee: CellXica Limited, Cambridge (GB)

( * ) Notice: Subject to any disclaimer, the term of this patent is extended or adjusted under 35 U.S.C. 154(b) by 0 days.

(21) Appl. No.: 15/679,530

(22) Filed: Aug. 17, 2017

(65) Prior Publication Data
US 2017/0347356 A1 Nov. 30, 2017

Related U.S. Application Data

(63) Continuation of application No. PCT/GB2015/054045, filed on Dec. 16, 2015.

(30) Foreign Application Priority Data

Feb. 18, 2015 (GB) .................................. 1502697.4

(51) Int. Cl.
*H04W 72/04* (2009.01)
*H04W 88/10* (2009.01)
*H04W 16/14* (2009.01)

(52) U.S. Cl.
CPC ... *H04W 72/0453* (2013.01); *H04W 72/0426* (2013.01); *H04W 88/10* (2013.01); *H04W 16/14* (2013.01)

(58) Field of Classification Search
CPC ......... H04W 72/0453; H04W 72/0426; H04W 88/10; H04W 16/14
See application file for complete search history.

(56) References Cited

U.S. PATENT DOCUMENTS 9,585,188 B2 * 2/2017 Jang .................... H04W 76/028
9,627,740 B2 * 4/2017 Katipally .............. H01P 11/007
(Continued)

FOREIGN PATENT DOCUMENTS

EP  2203011 A1  6/2010
EP  2469907 A1  6/2012
(Continued)

OTHER PUBLICATIONS

International Search Report and Written Opinion dated Mar. 17, 2016 in related application PCT/GB2015/054045 filed Dec. 16, 2015 and published Aug. 25, 2016 as WO2016/132090A1.

*Primary Examiner* — Brandon J Miller
(74) *Attorney, Agent, or Firm* — EIP US LLP

(57) ABSTRACT

Wireless communication apparatus is disclosed having a first base station providing an access point to a first communications network and second base station providing an access point to a second communication network. The first base station communicates wirelessly with a first access terminal using a first carrier at a first frequency and having a first bandwidth, and the second base station communicates wirelessly with a second access terminal using a set of carriers at respective different frequencies within a second frequency band, which has a second bandwidth larger than the first bandwidth and the first frequency is within the second frequency band. The second base station inhibits transmission of data by the second base station to the second access terminal using a subset of carriers having frequencies within the first bandwidth of the first frequency.

16 Claims, 4 Drawing Sheets

(56) References Cited

U.S. PATENT DOCUMENTS

| | | | | |
|---|---|---|---|---|
| 2012/0176926 A1* | 7/2012 | Jang | ................... | H04W 24/02 |
| | | | | 370/252 |
| 2013/0208664 A1* | 8/2013 | Viswanathan | ...... | H04W 52/243 |
| | | | | 370/329 |
| 2013/0273928 A1 | 10/2013 | Westerberg et al. | | |
| 2013/0308595 A1 | 11/2013 | Ratasuk et al. | | |

FOREIGN PATENT DOCUMENTS

| JP | H11215095 A | 8/1999 |
|---|---|---|
| WO | 2008088254 A1 | 7/2008 |
| WO | 2013171294 A1 | 11/2013 |

* cited by examiner

WIRELESS COMMUNICATION SYSTEM IN WHICH ONE RADIO ACCESS TECHNOLOGY OPERATES IN CONJUNCTION WITH A SECOND RADIO ACCESS TECHNOLOGY

CROSS-REFERENCE TO RELATED APPLICATIONS

This application is a continuation of International Patent Application No. PCT/GB2015/054045, filed on Dec. 16, 2015, which claims priority to United Kingdom Application No. GB 1502697.4, filed on Feb. 18, 2015. Each of the above-referenced patent applications is incorporated by reference in its entirety.

BACKGROUND OF THE INVENTION

Field of the Invention

This invention relates to a wireless communication system in which one radio access technology operates in conjunction with a second radio access technology. The invention has particular, but not exclusive, relevance to the co-existence of a GSM public land mobile network (PLMN) and an LTE or LTE-advanced PLMN.

Description of the Related Technology

Although LTE offers a number of advantages over older mobile communication standards, there is a need to maintain GSM coverage for voice calls and also for legacy telematics systems which utilize the GSM communication network.

An LTE signal can have a system bandwidth of 1.4, 3, 5, 10, 15 or 20 MHz, and is centered at a frequency that is a multiple of 100 kHz. In the time domain an LTE signal is divided into contiguous radio frames of 10 ms duration. As shown in FIG. 4, each radio frame is made up of 10 sub-frames, each subframe of 2 resource blocks (RBs), which in turn are made up of a number of symbols. So, in the time domain a resource block is 0.5 ms in duration. In the frequency domain a resource block is 180 kHz wide, corresponding to 12 subcarriers, each separated by 15 kHz. There are 6, 15, 25, 50, 75, and 100 resource blocks in the 1.4, 3, 5, 10, 15 or 20 MHz bandwidth systems respectively. Control data is scheduled across the system bandwidth of the LTE signal.

A GSM signal has a nominal bandwidth of 200 kHz centered at a frequency that is a multiple of 200 kHz.

SUMMARY

The present invention provides a new system in which GSM signals are embedded within the bandwidth of LTE signals. In this new system, a hybrid base station includes both an LTE eNodeB having an associated LTE frequency spectrum and a GSM base station in which the LTE eNodeB is arranged to clear space in the associated LTE frequency spectrum for the GSM signals. This can be achieved by inhibiting, within the physical layer of the LTE eNodeB, transmissions of LTE signals that would be in the RBs within the frequency range to be used for transmission of GSM signals. Optionally, the system can be enhanced by adding a datalink from the Basestation Subsystem (BSS) of the GSM cell to the eNodeB that carries timely information about the GSM traffic.

BRIEF DESCRIPTION OF THE DRAWINGS

Various embodiments of the invention will now be described, by way of example only, with reference to the attached figures in which.

DETAILED DESCRIPTION OF CERTAIN INVENTIVE EMBODIMENTS

Figure 1:
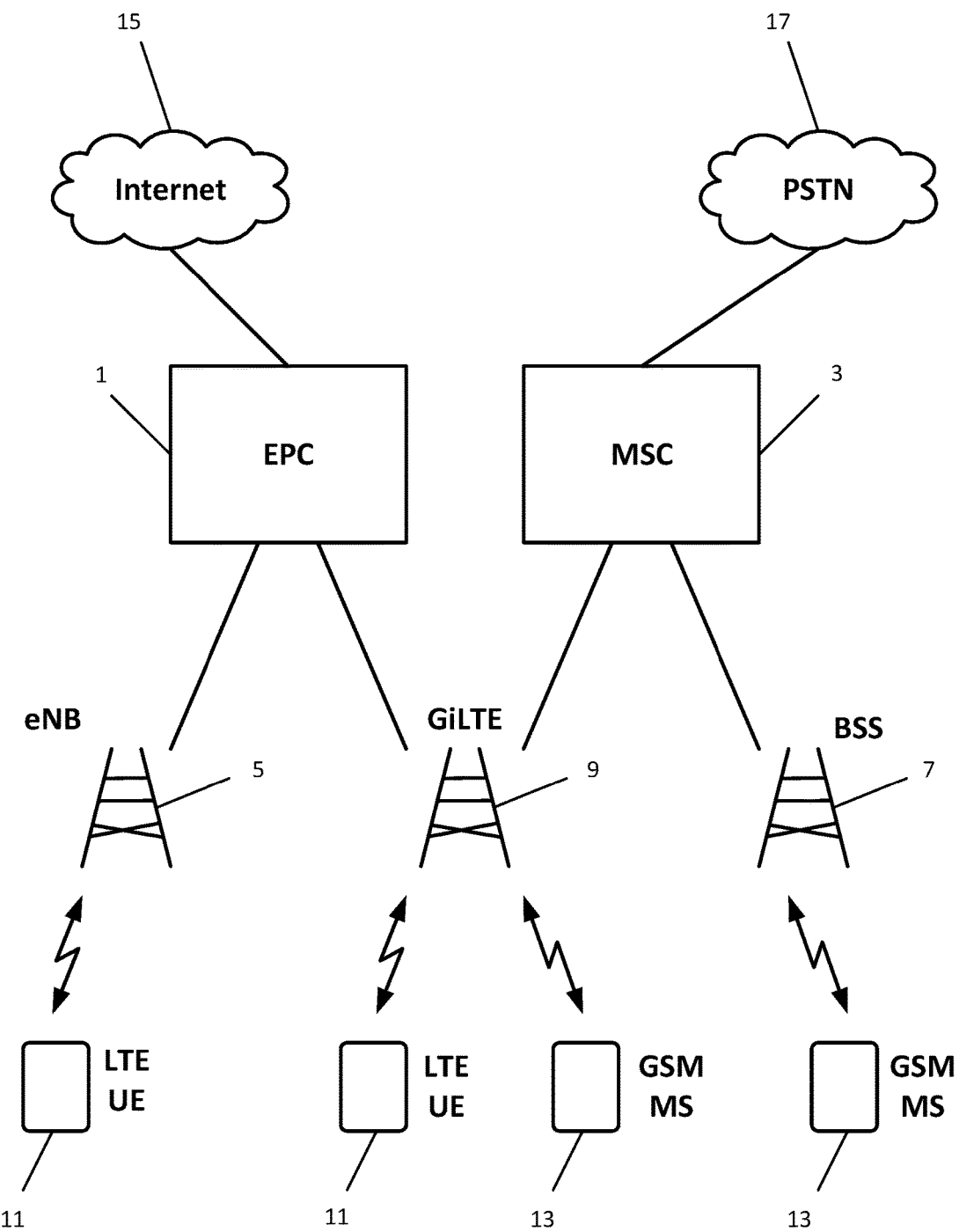
FIG. 1 schematically shows a wireless communication system according to an embodiment of the present invention.

FIG. 1 shows a wireless communication system including both an evolved packet core (EPC) 1 of a long term evolution (LTE) wireless communication system and a mobile switching center (MSC) 3 of a GSM wireless communication system. A conventional enhanced node B (eNodeB or eNB) 5 provides an access point to the LTE wireless communication system and a base station sub-system 7 provides an access point to the GSM wireless communication system. In addition, wireless communication apparatus 9 according to the present invention, hereafter referred to as a GiLTE node 9, provides an access point to the LTE wireless communication system and an access point to the GSM wireless communication system. In this way, an access terminal for the LTE wireless communication system, hereafter referred to as UE 11, can communicate with the EPC 1 via either the eNodeB 5 or the GiLTE node 9, and an access terminal for the GSM wireless communication system, hereafter referred to as an MS 13 can communicate with the MSC 3 via either the BSS 7 or the GiLTE node 9. The EPC 1 provides for the LTE 11 to communicate with remote network devices via the Internet 15, and the MSC 3 provides for the MS 13 to communicate with remote telecommunication devices via a Public Switched Telephone Network (PSTN) 17.

Figure 2:
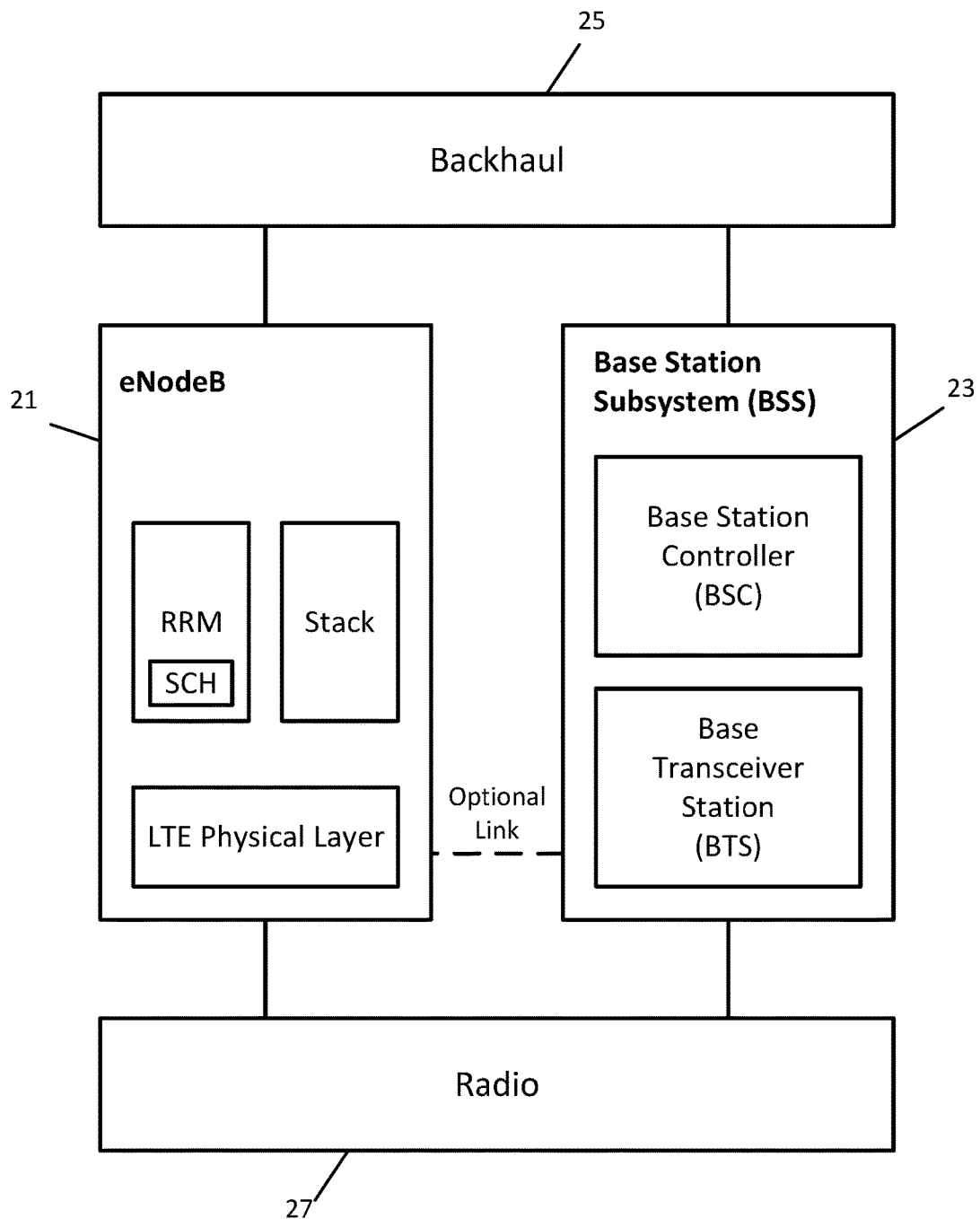
FIG. 2 schematically shows components of a hybrid LTE/GSM node forming part of the wireless communication system illustrated in FIG. 1.

FIG. 2 shows the main components of the GiLTE node 9. As shown, the GiLTE node 9 includes a modified eNodeB 21 and a BSS 23, which are both connected to backhaul 25 for communication with the EPC 1 and MSC 3 respectively. Further, the modified eNodeB 21 and the BSS 23 are both connected to a radio transceiver 27 for communication with a UE 11 and a MS 13 respectively. In particular, the radio transceiver 27 communicates with UEs 11 and MSs 13 using radio signals within a frequency band. In this embodiment, this frequency band has 3 MHz of paired spectrum from 1876.7 MHz to 1880.0 MHz for the downlink and 1781.7 MHz to 1785 MHz for the uplink, which is within the DECT Guardband in the UK. At present, the licensing of radio transmissions in this frequency band is technology agnostic. The invention can be utilized in DECT Guardbands for other countries, or at radio frequencies outside of the DECT Guardband in a country.

Within the frequency band, it is desired to send both LTE signals, allowing for data connectivity, and GSM signals, to take account of legacy mobile phones and telematics systems. According to this embodiment of the invention, a 3 MHz bandwidth GiLTE cell is provided together with a single GSM cell at a frequency within the frequency band over which the LTE signals are transmitted. This advantageously allows for greater data throughput in comparison with using a 1.4 MHz LTE bandwidth cell with the rest of the bandwidth being used by GSM carriers. There are, however, challenges to having the GSM cell operating at a frequency within the system bandwidth of an LTE cell.

The purpose of the changes to the modified eNodeB 21 is to leave space in the LTE system bandwidth for the GSM signals. A GSM signal has a nominal bandwidth of 200 kHz centered at a frequency that is a multiple of 200 kHz. An LTE signal has a system bandwidth of 1.4, 3, 5, 10, 15 or 20 MHz, and centered at a frequency that is a multiple of 100 kHz. To allow one or more GSM signals to be transmitted within the LTE spectrum, the LTE signal must be suppressed across the band(s) occupied by GSM signals. To create space for one or more GSM signals, no LTE signal is transmitted on RBs with specified indices. (Note that as LTE and GSM have the same duplex spacing in relevant bands, the index of the RBs carrying the downlink and uplink GSM signals will be the same). This is achieved by modifying the eNodeB's physical layer and scheduler, as described below.

For the downlink, the Physical Layer is modified so that LTE signals that would be in the RBs selected to carry GSM signals are not transmitted. The effect of this change on LTE performance is mitigated by:

changes to the eNodeB's RRM function, specifically the downlink scheduler, careful placement of the GSM signals within the LTE signal by a new operations and maintenance (O&M) function.

For the uplink, the RRM functions are modified to ensure that no UE is commanded to transmit in the RBs selected to carry GSM signals. As with the downlink, the effect of this on LTE system performance is mitigated by the placement of the GSM signals.

As will be described in more detail hereafter, the modification of the Physical Layer that inhibits the downlink signals in any of the RBs that are specified for use of a GSM signal involves the addition of a notch filter function, which may be invoked continuously or intermittently. Intermittent operation is appropriate where the GSM BSS provides timely information on the utilization of the GSM signals, such as occupied timeslots for traffic channels.

The modification of the downlink scheduler is to prevent the scheduling of Physical Downlink Shared Channels (PDSCHs) for transmission over RBs being used by the GSM signals. Further, in the uplink UEs are not allocated RBs being used for GSM signals for the transmission of Physical Uplink Shared Channels (PUSCHs) or Sounding Reference Signals (SRSs).

The new O&M function informs both GSM BSS and LTE eNodeB of the location of GSM signal(s) and which of these are designated as the beacon (C0). In locating the GSM signals, and hence the LTE RBs that are assigned to carry it, the O&M function ensures the following.

The overlap between the GSM allocation and the RBs used for PRACH is minimized.

The overlap between the GSM allocation and the RBs used for PCFICH and PHICH is minimized, for example by careful selection of the Physical Layer Cell Identity.

ARFCN and EARFCN are selected to maximize the minimum separation of GSM bandedge to the edge of the closest RBs above and below the GSM gap that carry LTE.

For the GSM cell to overlay a single LTE cell we need the duplex separation to be the same. Examples of such bands include the following.

GSM 450 with E-UTRA Band 31.
GSM 710 with E-UTRA Band 12.
T-GSM 810 with E-UTRA Band 27.
GSM 850 with E-UTRA Band 5.
P-GSM 900 with E-UTRA Band 8.
E-GSM 900 with E-UTRA Band 8.
R-GSM 900 with E-UTRA Band 8.
DCS 1800 with E-UTRA Band 3.
PCS 1900 with E-UTRA Band 2.
ER GSM 900 with E-UTRA Band 8.

Note that in some cases the FDD LTE band does not exactly match the GSM band so some ARFCN may not be supported.

The GSM cells are on a 200 kHz raster. The LTE cells are on a 100 kHz raster. This means that the center of two adjacent RBs may lie on a raster frequency, or may be displaced from the raster frequency by 20 kHz or 40 kHz. So, provided there is a free choice of the ARFCN, the nominal 200 kHz GSM channel may be located in one of the five positions. This gives a minimum transition bandwidth of 40 kHz, rather than the 80 kHz that would be available if the GSM cell is centralized.

If only a single ARFCN is supported, then there is by definition no GSM frequency hopping. If more than one ARFCN is supported, then hopping in the usual manner is acceptable. In the basic scheme there is no LTE frequency hopping.

In the basic scheme all LTE transmissions in the selected RBs are suppressed by the notch filter function. The eNodeB is modified to alleviate the effect of this on system performance in a channel dependent fashion. Examples of this follow.

PDSCH—by modifying the scheduler not to use these RBs.

PDCCH—by using a lower coding rate, if necessary.

PHICH—by minimizing the overlap with the suppressed RBs.

PCFICH—by minimizing the overlap with the suppressed RBs.

PBCH—by minimizing the overlap with the RBs.

PSS and SSS—the synchronization signals are essential to operation of the modified eNodeB 21, and accordingly the notch filter function (and therefore the GSM signals) is positioned not to affect these.

CSRS—given that the CSRS is typically used for demodulation of local resource elements, as none are being sent the suppression of the CSRS by the notch filter is acceptable, although there may be an impact on pathloss estimation and accordingly power control.

Given the importance of the PBCH to correct operation, avoiding use of these RBs for GSM is preferable. The RBs occupied by PCFICH and PHICH are a function of a number of system parameters. The example given in Table 1 below is for:

3 MHz bandwidth (i.e. 15 RBs)

7 symbols per slot 12 subcarriers per UE

Normal cyclic prefix

PHICH group scaling of one half (i.e. only a small number of PHICH groups) and for physical layer cell IDs of 0 to 10.

This shows that it is possible to find neighboring RBs, marked "X", that could be used for GSM that avoid those RBs used for PBCH (the central 7 RBs in this example) and those used for PCFICH (C) and PHICH (H).

TABLE 1

| ID | \multicolumn{15}{c}{RB} |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| 0 | C H | X | X | C |   | H |   | C |   |   | H | C | X | X | X |
| 1 | C | H | X | X | C | H |   |   | C |   | H | C | X | X | X |
| 2 |   | C H | X | X | C |   | H |   | C |   |   | H | C | X | X |
| 3 |   | C | H | X |   |   | C | H |   | C |   | H | C | X | X |
| 4 | X | X | C H |   |   | C |   | H |   | C |   |   | H | C |   |
| 5 | X | X | C | H |   |   | C | H |   |   | C |   | H | C | C |
| 6 | X | X | X | C H |   |   | C |   | H |   | C | X | X | H | C |
| 7 | X | X | X | C | H |   |   | C | H |   | C |   |   | H | H |
| 8 | C | X | X | X |   | H |   | C |   | H |   | C | X | X | X |
| 9 | C H | X | X | X |   | H |   |   | C |   | H |   | C | X | X |
| 10 |   | C H | X | X | C | H |   | C |   |   | H |   | C | X | X |

The situation is likely to improve at higher LTE system bandwidths because although the number of PHICH groups will increase the PCFICH size remains the same.

The location of the GSM RBs in the UL is the same as their location in the DL. So, if the GSM RBs are pushed to the bandedge, then they will overlap with the location of the PUCCH. This is undesirable.

A larger PUCCH region than we need for LTE may be defined and indexing may be used to avoid the outer RBs, but as the PUCCH region is at both ends of the band this might be prohibitively inefficient. A better solution might be to move the GSM RBs away from the bandedge (as is seen to be necessary in any case from the discussion on avoiding PCFICH and PHICH). The SRS would need to be set so that it avoids the GSM RBs.

Figure 3:
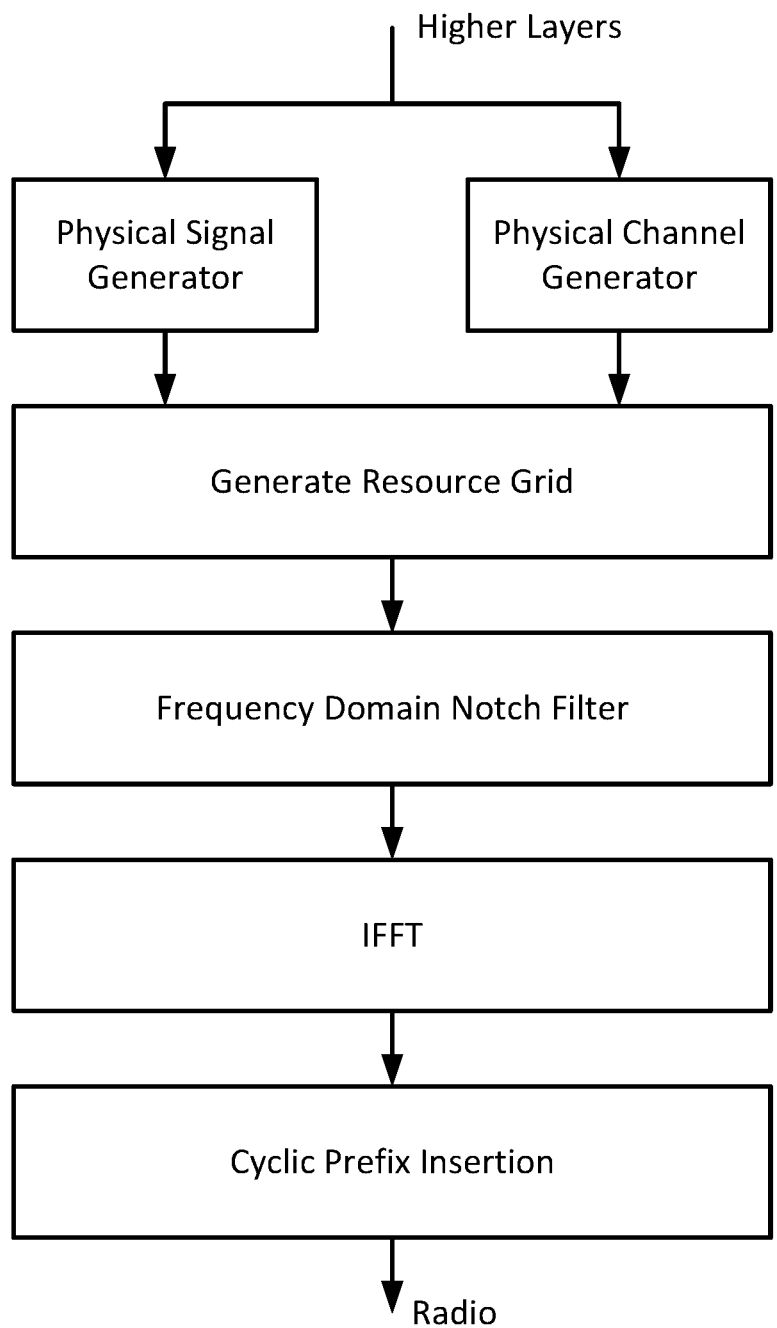
FIG. 3 schematically shows physical layer processes performed by an eNodeB forming part of the hybrid LTE/GSM node illustrated in FIG. 2.
Figure 4:
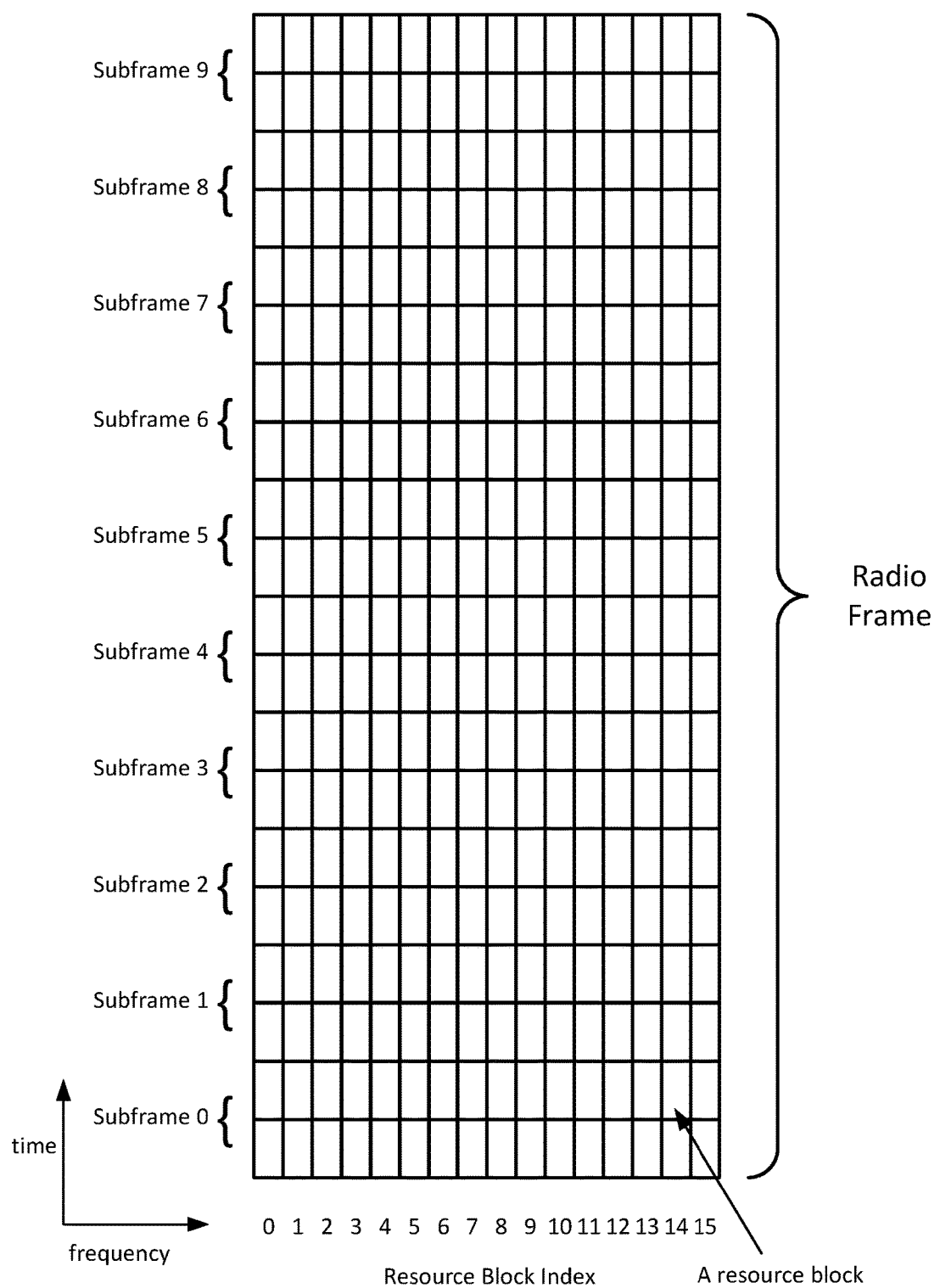
FIG. 4 shows a radio frame for an LTE communication system having a bandwidth of 3 MHz.

As discussed above, a notch filter function is provided in the Physical Layer of the modified eNodeB 21 to make space in the LTE system bandwidth for the GSM signals by ensuring that no LTE signals are transmitted on RBs with specified indices. FIG. 3 shows an implementation of the notch filter function which employs a frequency domain notch filter to zero the inputs to the IFFT used in the OFDM modulator corresponding to frequencies used by the GSM cell. Alternatively, the notch filter function could be implemented using a time domain filter following the IFFT or modification of the physical channel so that signals in the suppressed region are not created.

Modifications and Further Embodiments

The PHICH and PCFICH could be transmitted in the GSM RBs. The LTE signal will be seen as interference to the GSM signals, but have a low duty cycle and are subject to beating. They will overlap with the training sequence about 7% of the time. The GSM signal will corrupt the LTE signal. Where we need to transmit GSM C0, this is always present.

By clearing 3 RBs there would nominally be space for 2 GSM channels.

The present invention is equally applicable to LTE-advanced, in which addition traffic bearing RBs are provided. Further, it will be appreciated that the invention can be applied to other communication system having radio access technologies in which a first radio access technology communicates wirelessly using a first carrier at a first frequency and having a first bandwidth and a second radio access technology communicates wirelessly using a set of carriers at respective different frequencies within a second frequency band, wherein the second frequency band has a second bandwidth larger than the first bandwidth and the first frequency is within the second frequency band.

What is claimed is:

1. A wireless communication apparatus comprising:
    a first base station providing an access point to a first communications network, the first base station being operable to communicate wirelessly with a first access terminal using a first carrier at a first frequency and having a first bandwidth;
    a second base station providing an access point to a second communications network, the second base station being operable to communicate wirelessly with a second access terminal using a set of carriers at respective different frequencies within a second frequency band, wherein the second frequency band has a second bandwidth larger than the first bandwidth and the first frequency is within the second frequency band,
    wherein the second base station is arranged to inhibit transmission of data by the second base station to the second access terminal using a subset of carriers having frequencies within the first bandwidth of the first frequency, and wherein the second base station comprises:
        a scheduler arranged to schedule control data on the set of carriers; and
        a filter arranged to remove control data scheduled to be transmitted on said subset of carriers having frequencies within the first bandwidth of the first frequency.

2. The wireless communication apparatus of claim 1, wherein the scheduler is arranged not to schedule traffic data on said subset of carriers having frequencies within the first bandwidth of the first frequency.

3. The wireless communication apparatus of claim 1, wherein the filter comprises a frequency domain notch filter.

4. The wireless communication apparatus of claim 1, wherein the first base station is arranged to send scheduling information for assigning a carrier to the first access terminal for uploading of data to the first base station, wherein said carrier for uploading data is selected to have a frequency bandwidth that does not overlap the frequencies of said subset of said set of carriers.

5. The wireless communication apparatus of claim 1, wherein the first base station is operable to communicate wirelessly with one or more access terminals using plural carriers at respective different frequencies, and
    wherein the second base station is arranged to inhibit transmission of data by the second base station to the second access terminal using carriers having frequencies within the bandwidth of each of said plural carriers at respective different frequencies.

6. The wireless communication apparatus of claim 1, wherein the first base station is a Global Systems for Mobile Communications (GSM) base station.

7. The wireless communication apparatus of claim 1, wherein the second base station is a Long Term Evolution (LTE) base station or an LTE-advanced base station.

8. The wireless communication apparatus of claim 7, wherein the first base station is arranged to communicate wirelessly using one or more carriers that do not interfere with the Physical Broadcast Channel (PBCH), Physical Control Format Indicator Channel (PCFICH) and Physical Hybrid-ARQ Indicator Channel (PHICH) physical channels of the LTE base station.

9. The wireless communication apparatus of claim 8, wherein the second base station is arranged to inhibit transmission of Physical Downlink Control Channel (PDCCH) resource bearers on said carriers having frequencies within the bandwidth of each of said plural carriers at respective different frequencies.

10. The wireless communication apparatus of claim 9, wherein the second base station comprises:
  a scheduler arranged to schedule control data on the set of carriers; and
  a filter arranged to remove control data scheduled to be transmitted on said subset of carriers having frequencies within the first bandwidth of the first frequency.

11. The wireless communication apparatus of claim 10, wherein the scheduler is arranged not to schedule traffic data on said subset of carriers having frequencies within the first bandwidth of the first frequency.

12. The wireless communication apparatus of claim 10, wherein the filter comprises a frequency domain notch filter.

13. The wireless communication apparatus of claim 7, wherein the second base station is arranged to inhibit transmission of Physical Downlink Control Channel (PDCCH) resource bearers on said carriers having frequencies within the bandwidth of each of said plural carriers at respective different frequencies.

14. The wireless communication apparatus of claim 13, wherein the second base station is arranged to select an encoding scheme for the PDCCH resource bearers taking into account that no PDCCH resource bearers are transmitted on said carriers having frequencies within the bandwidth of each of said plural carriers at respective different frequencies.

15. The wireless communication apparatus of claim 1, further comprising operations and maintenance operable to signal both the first base station and the second base station.

16. The wireless communication apparatus of claim 1, further comprising a communication interface between the first base station and the second base station.

* * * * *